UNITED STATES PATENT OFFICE.

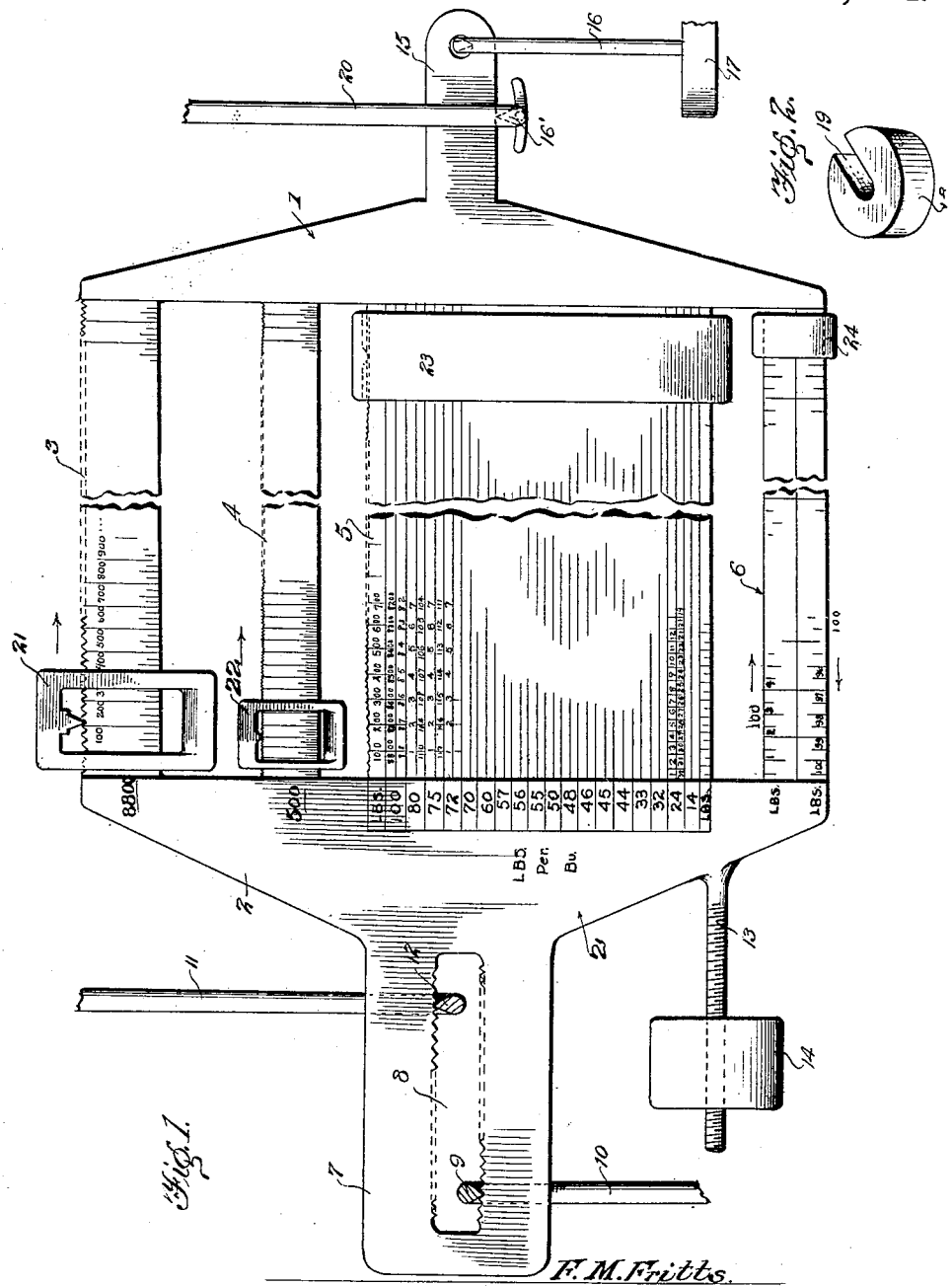

FRANCIS M. FRITTS, OF COFFEYVILLE, KANSAS, ASSIGNOR OF ONE-THIRD TO THOMAS SCOTT, OF TULSA, OKLAHOMA.

COMPUTING-SCALE BEAM.

1,371,780.      Specification of Letters Patent.     Patented Mar. 15, 1921.

Application filed March 10, 1920. Serial No. 364,672.

*To all whom it may concern:*

Be it known that I, FRANCIS M. FRITTS, a citizen of the United States, residing at Coffeyville, in the county of Montgomery and State of Kansas, have invented certain new and useful Improvements in Computing-Scale Beams, of which the following is a specification.

This invention relates to a computing scale beam and has for one of its objects the provision of a beam of this type which consists of several coöperating scales registering both in pounds and in units of quantity measure such as for example bushels, pecks or the like. A further object of the invention is to provide a scale beam with a vertical tabulation indicating the weight per unit of quantity measure and coöperating horizontal scales registering in number of units of quantity measure. With this arrangement it is possible to read off directly the number of bushels or other units of measure which are placed on a scale without separately dividing the goods or merchandise into such individual units of dry measure.

The invention has still another feature in that it provides a scale beam which is reversible in its action.

In the drawing:

Figure 1 represents, in side elevation, a scale beam constructed according to the present invention.

Fig. 2 is a detail perspective view of an additional weight.

The beam comprises a head 1 and a yoke 2 which are connected by scale members 3, 4, 5 and 6. The yoke 2 carries a tail-piece 7 provided with a slot 8 notched as shown to receive the bearing member 9 having the usual knife edge and which is carried by the platform rod 10 and also the supporting member 11 having a similar bearing member 12 with a knife edge and seating in one of the notches on the edges of the slot 8. Extending parallel with the tail-piece 7 is a threaded rod 13 carrying an adjustable weight 14 thereon for bringing the beam into balance. The head 1 of the beam carries an extension 15 from which is suspended a rod 16 carrying a weight 17 which for reversing the operation of the beam is also adapted to carry a weight 18 having a slotted portion 19 in which the rod 16 is received when the weight is positioned on the weight 17. A member 20 extends from the casing or housing of the scales over the extension 15 and carries a member 16' which is adapted to engage with said extension to hold the same steady when the scale is not in use. The upper scale 3 is divided as shown into divisions each of which equals one-hundred pounds. The scale 4 is also divided into pounds, the divisions of this scale running up to five-hundred and being sub-divided into fractions of pounds. The scale member 5 is divided vertically along its left hand edge into eighteen divisions numbered from one-hundred down to fourteen in pounds per bushel and opposite each vertical division and coöperating therewith are two scales divided into units indicating the number of bushels for that particular unit of the vertical tabulation. One of these scales runs from left to right of the member 5 while the other runs from right to left so that the beam may be used either in its ordinary manner or reversed. The extreme top edge of the member 5 and the extreme lower edge are divided into one-hundred pound divisions but the extreme lower edge is further graduated into smaller divisions as shown. The scale member 6 carries two scales divided into pounds one running from left to right and the other from right to left.

The poises 21, 22, 23 and 24 are located on the scale members 3, 4, 5 and 6 respectively. In using the scale the poises 21 and 22 are placed at the extreme left and the poises 23 and 24 are placed at the extreme right and the scale properly balanced by means of the member 14. After this has been done and it is desired to weigh some commodity such as grain which has been placed on the scale platform the operator of the scale moves the poises 23 and 24 to a point where the beam again balances and selects on the vertical tabulation the division which represents the weight per bushel of the commodity which he is weighing and on the horizontal scale coöperating with such vertical sub-division he reads the number of bushels contained in the quantity resting on the platform of the scale. If the quantity is even he will only have to read the position of the poise 23 but if the quantity is uneven he will also read the position of the poise 24. If it is desired to weigh in pounds the poises 21 and 22 are used on their respective scales but if only one-hundred pound subdivisions are required the poise 23 may still be used.

When it is desired to use the scale in the reverse order the weight 19 is placed on the weight 17 and the poises 23 and 24 shifted to the extreme right and the operator then proceeds to weigh in the usual manner.

I claim:

A scale beam consisting of a head, a yoke, a plurality of scale members connecting the head and the yoke, a tail-piece extending from the yoke for connection with a weighing mechanism, a balancing device on the yoke, a weight carrier suspended on the head, and poises on the several scale members, one of the scale members having a plurality of horizontal divisions thereon with each of said divisions graduated to indicate volume units and the yoke having a plurality of horizontal divisions at its edge alined with the respective divisions of the scale member and each bearing indicia denoting the number of weight units in a single volume unit represented by the scale beam division alined therewith.

In testimony whereof I affix my signature.

FRANCIS M. FRITTS. [L. S.]